(12) United States Patent
Hastings

(10) Patent No.: US 6,314,617 B1
(45) Date of Patent: Nov. 13, 2001

(54) RECONFIGURABLE HANDLE

(75) Inventor: John Hastings, Mankato, MN (US)

(73) Assignee: Johnson Worldwide Associates, Inc., Sturtevant, WI (US)

(*) Notice: Subject to any disclaimer, the term of this patent is extended or adjusted under 35 U.S.C. 154(b) by 0 days.

(21) Appl. No.: 09/376,205

(22) Filed: Aug. 18, 1999

(51) Int. Cl.[7] ............................................. A45B 9/02
(52) U.S. Cl. .............................. 16/436; 16/421; 16/431
(58) Field of Search ........................... 16/421, 431, 436, 16/177.1; 43/23; 81/177.6, 489; 473/549

(56) References Cited

U.S. PATENT DOCUMENTS

| | | | | |
|---|---|---|---|---|
| 555,872 | * | 3/1896 | Moore | 16/434 |
| 578,020 | * | 3/1897 | Morse | 16/431 |
| 2,091,458 | * | 8/1937 | Sleight | 16/421 |
| 2,121,718 | | 6/1938 | Sweetland | 273/81 |
| 2,205,769 | | 6/1940 | Sweetland | 145/61 |
| 2,423,640 | * | 7/1947 | Dally | 41/34 |
| 2,456,267 | | 12/1948 | Gazda | 74/543 |
| 3,156,943 | | 11/1964 | Groomer et al. | 16/110 |
| 3,845,954 | * | 11/1974 | Case | 473/549 |
| 4,617,697 | | 10/1986 | David | 16/110 R |
| 5,155,878 | | 10/1992 | Dellis | 16/111 R |
| 5,692,265 | | 12/1997 | Dalury | 16/111 R |
| 5,829,099 | | 11/1998 | Kopelman et al. | 16/111 R |
| 5,850,663 | | 12/1998 | Hardy et al. | 15/236.01 |
| 5,873,148 | | 2/1999 | Arnold | 16/111 R |

* cited by examiner

*Primary Examiner*—Anthony Knight
*Assistant Examiner*—Matthew E. Rodgers
(74) *Attorney, Agent, or Firm*—Foley & Lardner

(57) ABSTRACT

A reconfigurable handle usable on a variety of implements and method of selectively reconfiguring a gripping surface of a handle are disclosed herein. The reconfigurable handle includes an elongate shaft extending along a central axis, segments retained on the shaft, and a locking mechanism for selectively retaining or releasing the orientation of the segments relative to each other by linear compression. In one preferred embodiment, the reconfigurable handle further includes an outer covering to form a semi-smooth gripping surface on the outer circumference of the handle, an endcap to keep the segments on the shaft, and an intermediate layer to further enhance the gripping capability of the handle. The segments move in at least one of an axial direction along the shaft, a non-axial direction perpendicular to the shaft, and a rotational direction around the shaft.

50 Claims, 5 Drawing Sheets

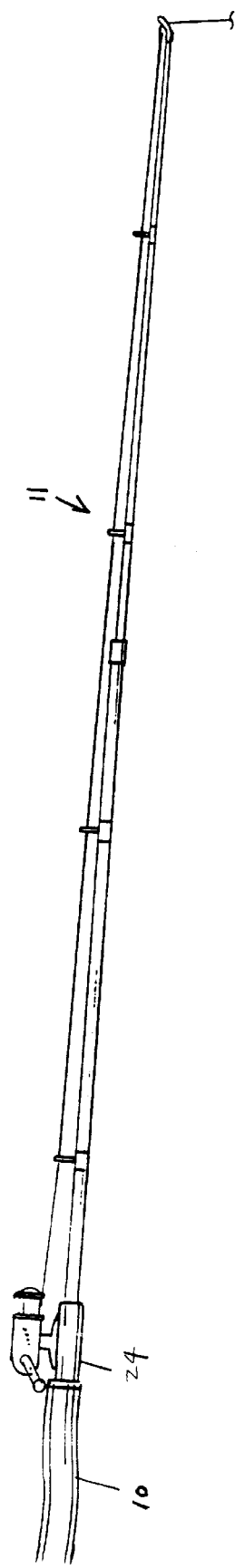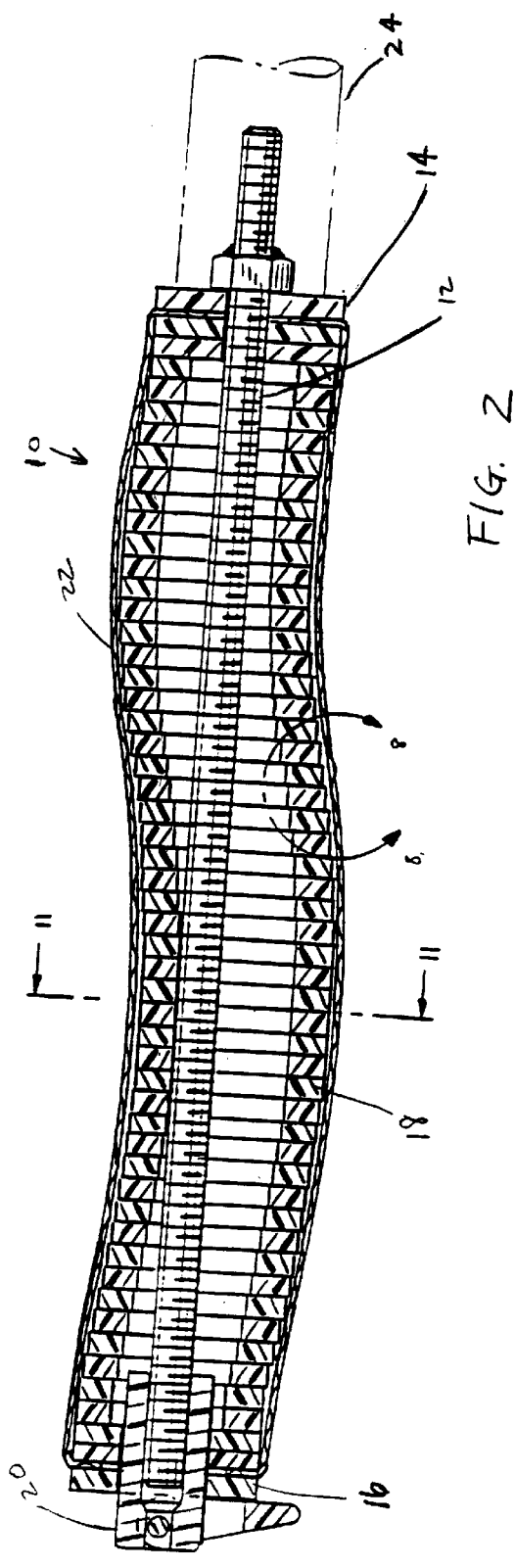

RECONFIGURABLE HANDLE

FIELD OF THE INVENTION

The present invention relates generally to the field of handles connected to a variety of implements such as recreational equipment or work tools. More particularly, the present invention relates to a handle capable of being reconfigured to conform to the contours of an user's hand.

BACKGROUND OF THE INVENTION

Implements with handles, such as recreational equipment and work tools, are utilized by the user's hand grasping the handle. Often such an implement is utilized for relatively long periods of time, require precise hand and arm control, and may be used by consecutive multiple users. Thus, a handle capable of conforming ergonomically to the contours of each user's hand would enhance user comfort, control, maneuverability, and decrease direct and indirect injuries which could result from using the implement.

Currently, various handles capable of conforming to an user's grip are available. For example, a common approach is to provide a pre-contoured handled generally conforming to an average hand and having a resilient outer layer that can be deformed temporarily at points of greatest pressure generated by the user's tight grip on the handle. However, this approach cannot provide adequate conformation if the user does not have an average hand, does not grip tightly enough, or wants to save the conformation for future use. Another approach is to provide a handle which can be custom molded by a third party. The obvious disadvantage is the additional expense and time associated with such custom fitting as well as the fact that the conformation is permanent and thus comfortable for only one user thereafter. Still another approach is to provide a handle having a shape molding capability through one or more layers of chemically or thermally activated materials. This approach provides custom fitting without undue time and expense. However, due to the small time frame available once the material has been activated in which the user must shape the handle and often due to the instability of such materials, this approach is unforgiving of mistakes in shaping the handle or inadvertent activation of the material. Furthermore, even if the handle is successfully molded, it cannot be remolded for any other person thereafter.

Therefore, there is a need for a handle that can be reconfigured quickly, easily, and inexpensively to conform to the contours of an user's hand. Moreover, the handle should provide means for saving the grip contours of the last user. Finally, the handle should be repeatedly reconfigurable to accommodate multiple users and to permit fine adjustments for the present user.

SUMMARY OF THE INVENTION

One embodiment of the invention relates to a reconfigurable handle having an elongate shaft extending along a central axis and a plurality of segments movably retained along and about the central axis of the shaft. The plurality of segments are movable by at least one of rotation and translation relative to the central axis to reconfigure an outer circumference of the handle.

In one preferred embodiment, the reconfigurable handle further includes a locking mechanism having a first position and a second position, an outer covering to form a semi-smooth gripping surface on the outer circumference of the handle, and an endcap to keep the segments on the shaft.

Another embodiment of the invention relates to a reconfigurable handle having an elongate shaft extending along a central axis, a segment moveably retained along and about the central axis of the shaft, and a member having a surface movably coupled to the shaft for axial movement along the central axis. The member moves between a first position, to compress the segment to selectively configure a gripping surface of the handle, and a second position, to release the segment for movement along and about the shaft.

Another embodiment of the invention relates to a method of selectively reconfiguring a gripping surface of a handle. The method includes moving a plurality of handle segments and selectively retaining the plurality of handle segments relative to one another and with respect to the central axis, thereby preserving the reconfigured gripping surface of the handle.

In one preferred embodiment, the method permits moving the handle segments in an axial direction, a non-axial direction, and a rotational direction, and retaining the handle segments by linearly compressing adjacent handle segments relative to one another. The method further includes selectively releasing the handle segments such that the gripping surface of the handle can be reconfigured a plurality of times as desired.

BRIEF DESCRIPTION OF THE DRAWINGS

The invention will become more fully understood from the following detailed description, taken in conjunction with the accompanying drawings, wherein like reference numerals refer to like parts, in which:

FIG. 1 is a side view of an implement including a reconfigurable handle of the present invention;

FIG. 2 is a cross-sectional side view of the reconfigurable handle of FIG. 1;

DETAILED DESCRIPTION OF THE PREFERRED EMBODIMENTS

Figure 3:
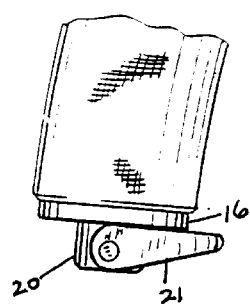
FIG. 3 is a partial side view of a locking mechanism of the reconfigurable handle of FIG. 1 shown in a first position.

Referring to FIGS. 1 and 2, FIG. 1 shows an implement 11, in this case a fishing rod, which incorporates the reconfigurable handle 10 of the present invention. It should be understood that implement 11 can generally be any implement requiring a handle including a variety of recreation equipment or working tools, such as fishing rods, ski poles, rackets, lawn and gardening tools, construction tools such as hammers and the like, and kitchen utensils. In FIG. 2, a reconfigurable handle 10 includes a shaft 12, endcaps 14, 16, segments 18, a locking mechanism 20, and an outer covering 22. Shaft 12 is preferably an elongate shaft axially extending along a central axis and extending through segments 18 and endcap 16. Shaft 12 is preferably attached to a portion 24 of the implement for which the handle 10 is being utilized, such as the fishing rod shown in FIG. 1.

Endcap 14 extends between handle 10 and portion 24. Endcap 14 provides a surface against which segments 18 are placed in compression by locking mechanism 20 to secure segments 18 as desired. In an alternate embodiment, endcap 14 may be omitted when segments 18 can be held in compression by abutting portion 24 directly. In still another embodiment, endcap 14 may be integrally formed as a part of portion 24 or as a part of shaft 12.

Endcap 16 is movably retained about shaft 12 on the opposite end to endcap 14. Endcap 16 slides axially along shaft 12, in response to locking mechanism 20, to retain segments 18 in linear compression or to release segments 18 from linear compression between endcaps 14 and 16. Alternately, endcap 16 may be integrally formed as a part of locking mechanism 20.

Segments 18 preferably comprise annular washers formed from soft, semi-soft, semi-rigid, or rigid materials, including plastics, metals, composites, and elastomers, which encircle shaft 12 between endcaps 14, 16. When segments 18 are not in compression by locking mechanism 20, segments 18 move relative to one another along and about the axis of shaft 12 such that the outer circumferential surface of handle 10 may be varied relative to shaft 12 to create a customized gripping surface. Segments 18 may move in an axial direction along shaft 12, move in a non-axial direction relative to shaft 12 such as perpendicular to the axis of shaft 12, and/or rotate about shaft 12. Then when segments 18 have all been positioned relative to shaft 12 such that handle 10 has a desired outer circumferential surface along its length, locking mechanism 20 is actuated to compress segments 18 between endcaps 14, 16. This compression of segments 18 causes each segment 18 to frictionally engage the adjacent segments 18 to retain segments 18 in place with respect to each other and to shaft 12.

Figure 11:
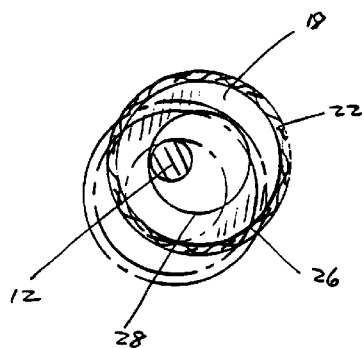
FIG. 11 is a cross-sectional view taken generally along line 11—11 of FIG. 2 showing segments moving around and about a shaft.
Figure 17:
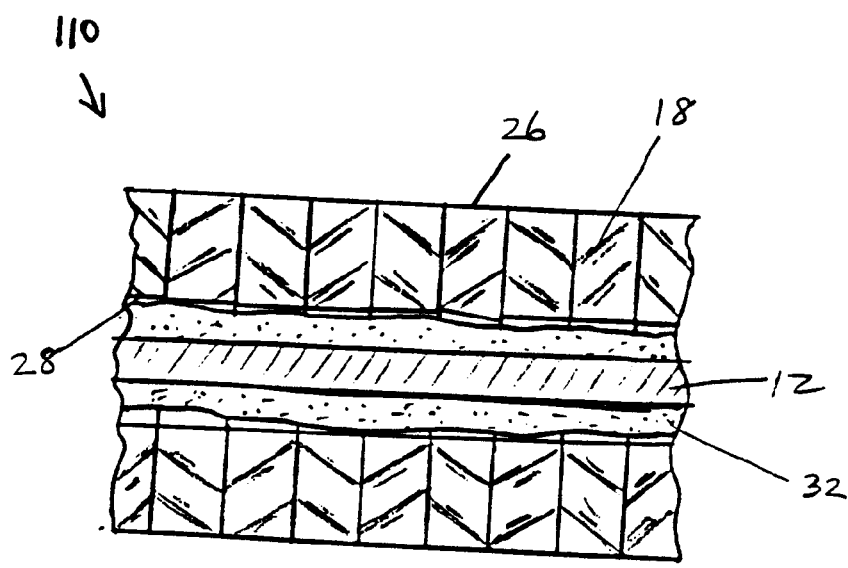
FIG. 17 is a cross-sectional side view of an alternative embodiment of the reconfigurable handle of FIG. 2 showing an intermediate layer disposed between the segments and a shaft.

Each of segments 18 is a washer having an outer circumference 26 and a hollow inner circumference 28 (shown in FIG. 11), wherein the inner circumference 28 encircles shaft 12. Referring to FIG. 11, there is shown a preferred embodiment of segments 18, wherein outer circumference 26 has annular shape and the inner and outer circumferences 26, 28 are concentric with respect to the geometric center of each segment. Moreover, as shown in FIG. 17, segments 18 are uniform to each other, but not limited to, in their thickness, diameter, shape, texture, and type of material.

Figure 12:
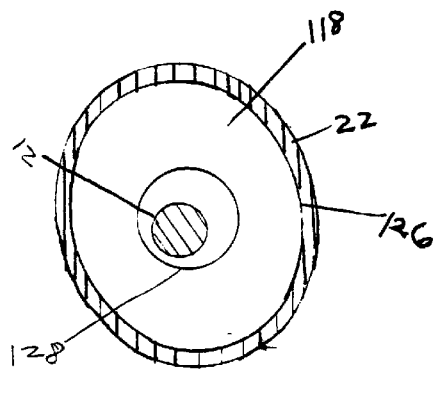
FIG. 12 is a cross-sectional front view of a first alternative embodiment of the reconfigurable handle of FIG. 11.
Figure 13:
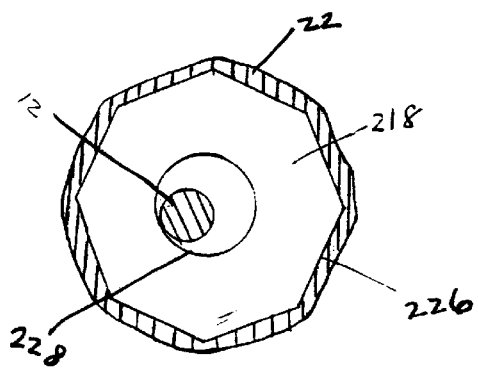
FIG. 13 is a cross-sectional front view of a second alternative embodiment of the reconfigurable handle of FIG. 11.
Figure 14:
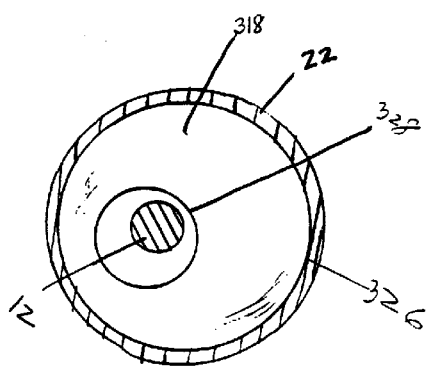
FIG. 14 is a cross-sectional front view of a third alternative embodiment of the reconfigurable handle of FIG. 11.
Figure 15:
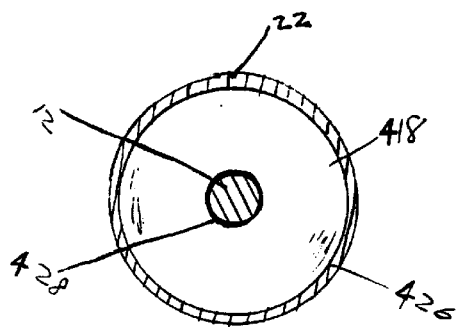
FIG. 15 is a cross-sectional front view of a fourth alternative embodiment of the reconfigurable handle of FIG. 11.

Alternatively, segments 18 may have various configurations and shapes. For example, FIGS. 12 and 13 illustrate segments 118 and 218 having outer circumferences 126 and 226, respectively. Outer circumference 126 is oval. Alternatively, circumference 126 may have other eccentric configurations. Outer circumference 226 is octagonal. Alternatively, circumference 226 may have greater or fewer number of sides. FIG. 14 shows the inner and outer circumferences 328, 326 eccentric with respect to the axis of shaft 12. FIG. 15 shows the inner circumference 428 having a small enough diameter such that circumference 428 contacts or very nearly contacts shaft 12. Although segments 418 may not move in a non-axial direction relative to shaft 12 such as perpendicular to the axis of shaft 12, segments 418 may rotate around or translate along the axis of shaft 12. Each outer circumference 426 of segments 428, although not shown, likely would have eccentric configuration and segments 428 may be non-uniform to each other.

Figure 8:
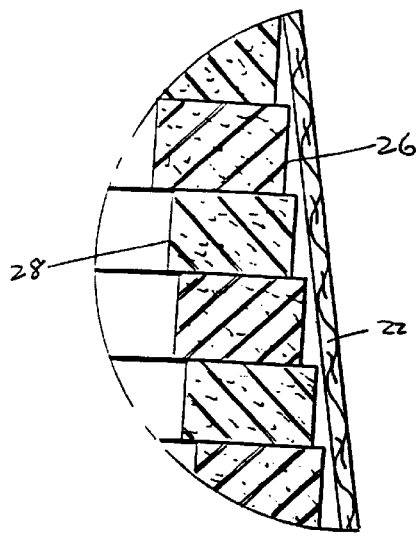
FIG. 8 is a cross-sectional view of the reconfigurable handle of FIG. 2 taken generally along line 8—8.
Figure 9:
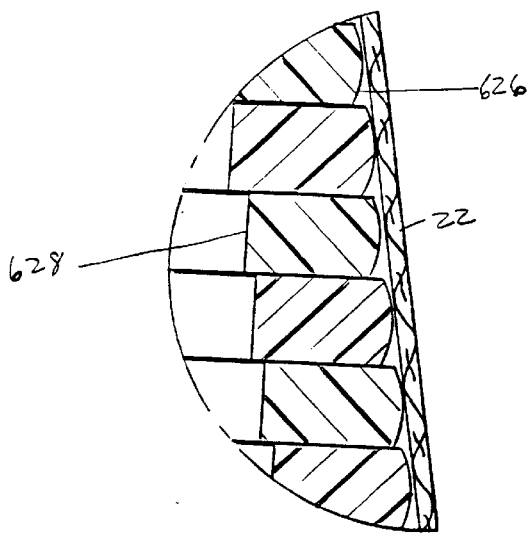
FIG. 9 is a cross-sectional view of a first alternative embodiment of the reconfigurable handle of FIG. 8.
Figure 10:
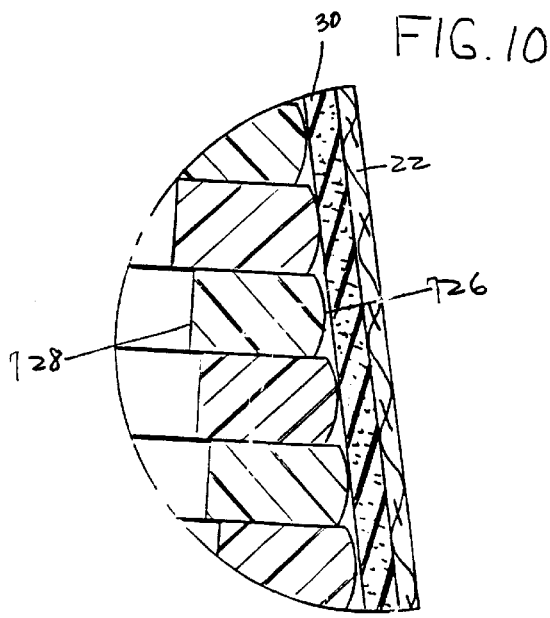
FIG. 10 is a cross-sectional view of a second alternative embodiment of the reconfigurable handle of FIG. 8.
Figure 16:
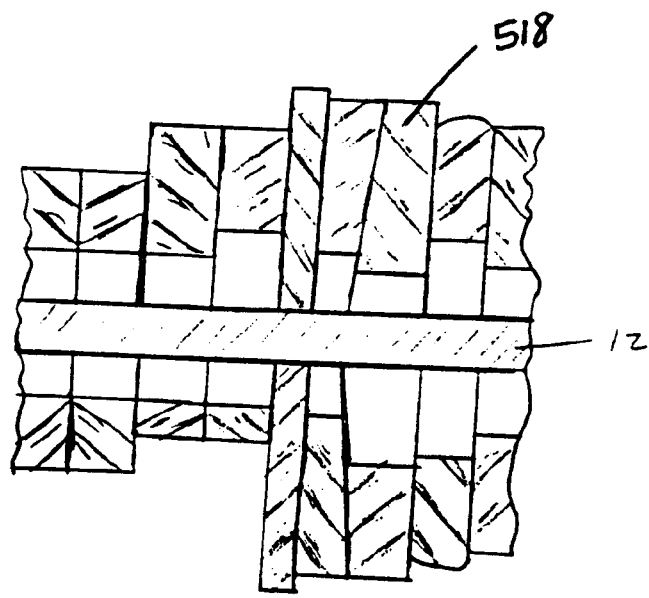
FIG. 16 is a fragmentary cross-sectional side view of an alternative embodiment of the reconfigurable handle of FIG. 2 showing uniform and non-uniform segments along and about a shaft.

FIG. 16 shows segments 518 of handle 10 non-uniform to each other in their thickness, shape, and diameter. Additionally, segments 518 may be non-uniform in their texture and type of material. As shown in FIGS. 8–10, the contour of outer circumference 26 may be planar, curved, or otherwise textured. Finally, segments 18 may be comprised of a variety of material such as, but not limited to, a compressible type of material, a resilient type of material, a flexible type of material, a moisture absorbent type of material, a shock absorbent type of material, and a non-slipping type of material. Examples of such materials include thermoplastics, thermosetting materials, composites, and common metals.

Figure 4:
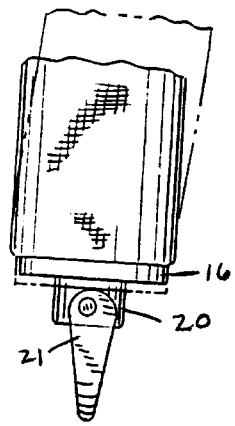
FIG. 4 is a partial side view of the locking mechanism of FIG. 3 in a second position.
Figure 5:
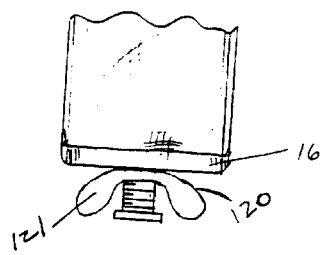
FIG. 5 is a partial side view of an alternate embodiment of the locking mechanism of FIGS. 3 and 4.

Locking mechanism 20 preferably comprises a linear compression mechanism positioned on the end of shaft 12 adjacent endcap 16. When locking mechanism 20 is in a first position (i.e., the locked position), locking mechanism 20 retains adjacent segments 18 relative to each other to form the gripping surface. When locking mechanism 20 is in a second position (i.e., the unlocked or open position), locking mechanism 20 releases adjacent segments 18 permitting movement of segments 18. Referring to FIGS. 3 and 4, locking mechanism 20 comprises a cam 21 pinned to the end of shaft 12 adjacent endcap 16. FIG. 3 shows cam 21 in the first position and FIG. 4 shows cam 21 in the second position. Alternatively, locking mechanism 20 could comprise other well-known mechanisms providing linear movement. For example, FIG. 5 illustrates locking mechanism 120 which includes a nut 121 threaded about an end of shaft 12, whereby rotation of nut 121 moves endcap 16 towards and away from endcap 14 to, respectively, lock or release segments 18 therebetween.

Outer covering 22 comprises a flexible layer disposed over segments 18. In the preferred embodiment, outer covering 22 is comprised of a flexible and resilient moisture absorbing fabric which stretches and resiliently deforms as segments 18 move relative to shaft 12. Alternately, outer covering 22 can comprise, but is not limited to, a compressible type of material, a shock absorbing type of material, a non-slipping type of material, and a textured material. Examples of such materials include elastomeric plastics, natural and synthetic rubbers, vinyl compounds, polyurethanes, and natural and synthetic fabrics. Outer covering 22, as shown in FIGS. 8–10, extends over segments 18 to provide handle 10 with a smooth exterior surface.

In use, when locking mechanism 20 is unlocked, segments 18 of handle 10 will automatically conform to the user's hand size and shape upon being grasped. Once the user is satisfied with the grip of handle 10, the user merely locks locking mechanism 20. In this manner, a gripping surface conforming to the user's hand is easily formed and retained. Then if the user desires to change his grip or the implement with handle 10 is to be used by another user, the present user merely unlocks locking mechanism 20, regrasps handle 10, and then relocks locking mechanism 20.

The reconfigurable handle 10 of the present invention can be embodied with various other structures. FIG. 17 illustrates handle 110, an alternative embodiment of handle 10. Handle 110 is similar to handle 10 except that handle 110 further includes an intermediate layer 32 disposed between shaft 12 and segments 18. The intermediate layer 32 may comprise, but is not limited to, a compressible material, a resilient material, a flexible material, a moisture absorbent material, and a shock absorbent material. In the exemplary embodiment, layer 32 is formed from materials such as elastomeric plastics, natural and synthetic rubbers, vinyl compounds, polyurethanes, and natural and synthetic fabrics. Layer 32 provides smoother movement of segments 18 and greater user comfort when handle 110 is gripped.

Figure 6:
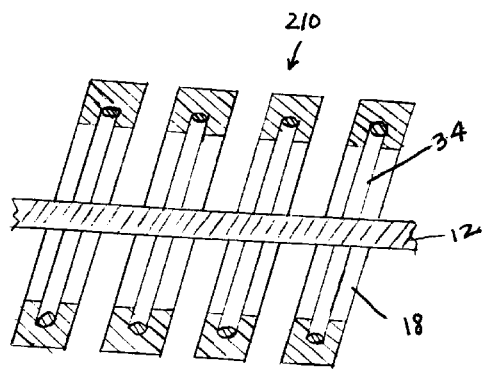
FIG. 6 is a cross-sectional partial side view of a first alternative embodiment of the reconfigurable handle of FIG. 1.
Figure 7:
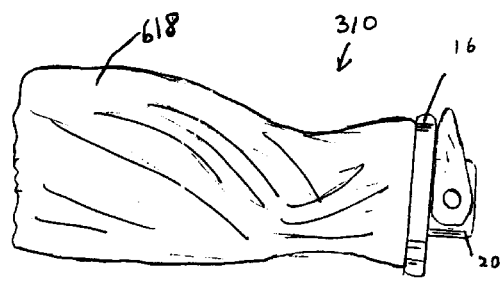
FIG. 7 is a partial side view of a second alternative embodiment of the reconfigurable handle of FIG. 1 shown with a monolithic resilient segment deformed and locked into position.

In another alternative embodiment, FIG. 6 illustrates handle 210, which is similar to handle 10 except that handle 210 further includes a coil spring 34 encircling and extending along shaft 12. Segments 18 would be interconnected (e.g. embedded) to coil spring 34 such that the locking mechanism 20 in the locked position causes the coil spring 34 to deform accordingly and to provide the desired gripping surface for handle 210. In still another alternative embodiment, FIG. 7 illustrates handle 310 which is similar to handle 10 except that segments 618 of handle 310 comprises an one-piece resilient material, wherein one portion of the material can be deformed relative to another portion of the material (e.g., by twisting or compressing the material) and then the deformed shape is preserved by activating locking mechanism 20. This deformation of segments 618 would be carried out by the user in accordance with the gripping surface desired.

It should be apparent that there has been provided in accordance with one embodiment of the present invention a reconfigurable handle which can be implemented in a variety of recreational equipment and tools. While the embodiments illustrated in the FIGS. and described above are presently preferred, it should be understood that these embodiments are offered by way of example only. Accordingly, the invention is not limited to a particular embodiment, but extends to alternatives, modifications, and variations that nevertheless fall within the spirit and scope of the appended claims.

What is claimed is:

1. A reconfigurable handle comprising:

an elongate shaft extending along a central axis; and a plurality of segments movably retained along and about the central axis of the shaft, wherein the plurality of segments move between a released position in which the plurality of segments are movable by at least one of rotation and translation relative to the central axis to reconfigure an outer circumference of the handle into a first configuration or a second configuration a plurality of times as desired and a locked position in which the plurality of segments engage one another to retain the plurality of segments in place in either of the first or second configuration, and wherein the plurality of segments are retained along and about the central axis of the shaft in the same order relative to each other for the first or second configuration.

2. The reconfigurable handle of claim 1 further including a locking mechanism positioned on the shaft, the locking mechanism configured to move between a first position in which the mechanism retains adjacent segments relative to each other and a second position in which adjacent segments are released for movement relative to each other to reconfigure the outer circumference of the handle.

3. The reconfigurable handle of claim 2 wherein the locking mechanism comprises means for linearly compressing adjacent segments relative to each other and with respect to the central axis when the locking mechanism is in the first position.

4. The reconfigurable handle of claim 2 further comprising a coil spring positioned about the shaft and interconnecting the plurality of segments such that the coil spring deforms about the central axis when the locking mechanism is in its first position.

5. The reconfigurable handle of claim 1 further comprising at least one outer covering disposed over at least one of the plurality of segments to form a semi-smooth gripping surface on the outer circumference of the handle.

6. The reconfigurable handle of claim 5 wherein the at least one outer covering is comprised of a compressible type of material.

7. The reconfigurable handle of claim 5 wherein the at least one outer covering is comprised of a resilient type of material.

8. The reconfigurable handle of claim 5 wherein the at least one outer covering is comprised of a flexible type of material.

9. The reconfigurable handle of claim 5 wherein the at least one outer covering is comprised of a moisture absorbent type of material.

10. The reconfigurable handle of claim 5 wherein the at least one outer covering is comprised of a shock absorbent type of material.

11. The reconfigurable handle of claim 5 wherein the at least one outer covering is comprised of a non-slipping material.

12. The reconfigurable handle of claim 5 wherein the at least one outer covering is comprised of a textured material.

13. The reconfigurable handle of claim 1 further comprising at least one endcap positioned on the shaft to keep the at least one of the plurality of segments on the shaft.

14. The reconfigurable handle of claim 1 wherein at least one of the plurality of segments comprises a washer having an outer circumference and a hollow inner circumference, wherein the inner circumference encircles the shaft.

15. The reconfigurable handle of claim 14 wherein the outer circumference has annular shape.

16. The reconfigurable handle of claim 14 wherein the outer circumference has eccentric shape.

17. The reconfigurable handle of claim 14 wherein at least one of the inner and outer circumference is eccentric with respect to the central axis of the shaft.

18. The reconfigurable handle of claim 14 wherein at least one of the inner and outer circumference is concentric with respect to the central axis of the shaft.

19. The reconfigurable handle of claim 1 wherein at least two of the plurality of segments are uniform to each other with respect to at least one of thickness, diameter, shape, texture, and type of material.

20. The reconfigurable handle of claim 1 wherein at least two of the plurality of segments are non-uniform to each other with respect to at least one of thickness, diameter, shape, texture, and type of material.

21. The reconfigurable handle of claim 1 wherein at least one of the plurality of segments comprises a compressible type of material.

22. The reconfigurable handle of claim 1 wherein at least one of the plurality of segments comprises a resilient type of material.

23. The reconfigurable handle of claim 1 wherein at least one of the plurality of segments comprises a flexible type of material.

24. The reconfigurable handle of claim 1 wherein at least one of the plurality of segments comprises a moisture absorbent type of material.

25. The reconfigurable handle of claim 1 wherein at least one of the plurality of segments comprises a shock absorbent type of material.

26. The reconfigurable handle of claim 1 wherein at least one of the plurality of segments comprises a non-slipping material.

27. The reconfigurable handle of claim 1 further comprising an intermediate layer disposed between the shaft and at least one of the plurality of segments wherein the intermediate layer is a type of material selected from the group including a compressible material, a resilient material, a flexible material, a moisture absorbent material, and a shock absorbent material.

28. The reconfigurable handle of claim 1 wherein the shaft is a substantially rigid, incompressible core.

29. The reconfigurable handle of claim 1, wherein surfaces of the plurality of segments that are substantially perpendicular to the central axis frictionally engage each other when in the locked position.

30. The reconfigurable handle of claim 1, wherein the plurality of segments in the locked position engage each other in a direction substantially along the central axis.

31. A reconfigurable handle comprising:
   an elongate shaft extending along a central axis;
   at least a first segment and a second segment, each of the first segment and the second segment movably retained along and about the central axis of the shaft, wherein the first segment and the second segment comprise a handle along the axis, each of the first segment and the second segment movable by at least one of rotation and translation relative to the central axis to reconfigure an outer circumference of the handle into a first configuration or a second configuration a plurality of times as desired, and the first and second segments retained along and about the central axis of the shaft in the same order relative to each other for the first or second configuration; and
   a member having a surface movably coupled to the shaft for axial movement along the central axis, wherein the surface of the member moves between a first position, in which the surface of the member causes the first segment and the second segment to engage each other to selectively configure a gripping surface of the handle in either of the first or second configuration, and a second position, in which the surface of the member releases the first segment and the second segment for movement along and about the shaft.

32. The reconfigurable handle of claim 31 wherein the member comprises a means for linearly compressing the at least one first segment to lock the orientation of the at least one first segment relative to the central axis to form the gripping surface of the handle.

33. The reconfigurable handle of claim 31 further comprising at least one cover disposed over the at least one first segment.

34. The reconfigurable handle of claim 31 further comprising at least one endcap positioned on the shaft to retain the at least one first segment.

35. The reconfigurable handle of claim 31 further comprising a coil spring positioned about the shaft and interconnected to the at least one first segment, wherein the member in its first position causes the coil spring to deform about the central axis.

36. The reconfigurable handle of claim 31 wherein the at least one first segment comprises a monolithic resilient material extending along and about the shaft and wherein one portion of the at least one first segment can be deformed relative to another portion of the at least one first segment to reconfigure the outer circumference of the handle.

37. The reconfigurable handle of claim 31 further comprising at least one second segment movably retained along and about the central axis of the shaft, wherein the at least one second segment is movably by at least one of rotation and translation relative to the central axis to reconfigure the outer circumference of the handle, and wherein the at least one first segment is a washer having a first inner circumference and a first outer circumference and the at least one second segment is an another washer having a second inner circumference and a second outer circumference.

38. The reconfigurable handle of claim 37 wherein at least one of the first and second outer circumferences is configured concentric with respect to the central axis of the shaft.

39. The reconfigurable handle of claim 37 wherein at least one of the first and second outer circumferences is configured eccentric with respect to the central axis of the shaft.

40. The reconfigurable handle of claim 37 wherein at least one of the first and second outer circumferences is annular in form.

41. The reconfigurable handle of claim 37 wherein at least one of the first and second outer circumferences is eccentric in form.

42. The reconfigurable handle of claim 37 wherein the at least one first and second segments are uniform to each other.

43. The reconfigurable handle of claim 37 wherein the at least one first and second segments are non-uniform with respect to each other.

44. The reconfigurable handle of claim 37 wherein the at least first and second segments comprise a type of material selected from the group including a compressible material, a resilient material, a flexible material, a moisture absorbent material, and a shock absorbent material.

45. A method of selectively reconfiguring a gripping surface of a handle, comprising:
   moving at least one of a plurality of handle segments retained along and about an elongate handle shaft extending along a central axis; and
   selectively retaining the plurality of handle segments relative to one another and with respect to the central axis to preserve the reconfigured gripping surface of the handle in either a first configuration or a second configuration a plurality of times as desired, wherein the plurality of handle segments are retained along and about the elongate handle shaft in the same order relative to each other for the first or second configuration, and wherein selectively retaining the plurality of handle segments includes engaging the plurality of handle segments to each other in a direction substantially along the central axis.

46. The method of claim 45 wherein moving at least one of a plurality of handle segments includes moving the handle segment in at least one of an axial direction along the central axis of the shaft, a non-axial direction substantially perpendicular to the central axis of the shaft, and a rotational direction around the central axis of the shaft.

47. The method of claim 45 wherein selectively retaining the plurality of handle segments includes engaging adjacent handle segments relative to one another for causing the orientation of each of the plurality of handle segments, relative to each other and the central axis, to be preserved.

48. The method of claim 45 further comprising selectively releasing the plurality of handle segments such that the gripping surface of the handle can be reconfigured a plurality of times as desired by repeating the moving step, the selectively retaining step, and the selectively releasing step.

49. The reconfigurable handle of claim 31, wherein surfaces of the first segment and the second segment frictionally engage each other when the member is in the first position.

50. The reconfigurable handle of claim 31, wherein the first segment and the second segment in the first position engage each other in a direction substantially along the central axis.

* * * * *